Sept. 22, 1936.   GUSTAV-ADOLF SCHRÖTER   2,054,885

METHOD OF DETECTING THE PRESENCE OF MUSTARD GAS (YPERITE)

Filed Aug. 28, 1935

Inventor:
Gustav-Adolf Schröter
by Bailey & Carson
Attorney

Patented Sept. 22, 1936

2,054,885

UNITED STATES PATENT OFFICE 2,054,885

METHOD OF DETECTING THE PRESENCE OF MUSTARD GAS (YPERITE)

Gustav-Adolf Schröter, Dessau, Germany, assignor to Otto Heinrich Drager, Lubeck, Germany Application August 28, 1935, Serial No. 38,265
In Germany May 24, 1933

13 Claims. (Cl. 23—230)

This invention relates to a method of detecting the presence of di-chlor-diethyl sulphide or mustard gas (Yperite) as used in gas warfare.

For air protection it is extremely important to be able to detect mustard gas readily and with certainty as it is necessary to destroy or annihilate this gas after an attack has been made. Therefore, it is further necessary to examine whether such destruction is necessary and, it may be, whether it has been complete.

It has now been found that mustard gas can be readily detected by the use of salts of the heavy metals. In the reaction between the mustard gas to be detected and the salt of the heavy metal there occurs a change of colour which is utilized as an indication of the presence of mustard gas. Salts of heavy metals may be used in aqueous solutions in combination with aqueous solutions of hydrogen peroxide. As suitable salts there may be mentioned cuprous chloride, gold chloride, platinum chloride and palladium chloride. The use of gold chloride is preferred.

The invention has for its primary object to disclose and provide a method for the detection of mustard gas which can be practiced by persons having no chemical knowledge, which can be performed rapidly, and which gives positive results.

A device for use in the performance of the said method is illustrated diagrammatically by way of example in the accompanying drawing.

Figure 1:
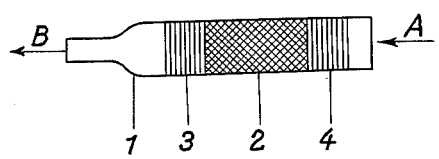
Fig. 1 shows a test tube before test.

The test tube illustrated in the drawing consists wholly or in part of transparent material, as, for example, glass.

Figure 2:
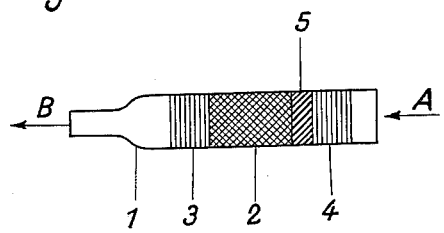
Fig. 2 shows the same test tube after a test.

The air to be tested for the presence of mustard gas flows in the direction of the arrow A into the tube which has preferably a wide inlet and emerges in the direction of the arrow B from the end of the tube which is preferably tapered at this point. 2 denotes a mass adapted to adsorb mustard gas. The mass 2 is preferably a colourless or white gel, as, for example, silica gel. The gel is held in its position in the tube by two plugs 3 and 4 of glass wool or the like. If gas or air suspected to be admixed with mustard gas has been sucked through the tube, and thus through the layer of silica gel, and if there is then introduced at the inlet end of the tube a small quantity of the testing liquid, e. g. of an aqueous solution of a salt of a heavy metal, preferably an aqueous solution of gold chloride, a change of colour will be seen after some seconds, if mustard gas is present in the mixture. This colour change consists in conversation to a bright yellow colour of a more or less broad band 5 (Fig. 2) located towards the inlet end of the tube. The periphery of this band is seen through the tube as a bright yellow ring. This coloured band is particularly noticeable if the gel is located in the tube by having its end faces defined by fixed boundaries. This gel layer may be fixed in the tube without boundaries but the provision of the plugs is to be recommended.

A further improvement of the perceptibility is obtained by destroying the excess amount of solution of a metal salt. This may be done with gold chloride e. g. by hydrogen peroxide or formaldehyde or other reduction agents, with other precious metals likewise by reduction agents e. g. ferrous sulfate solutions. The reduction agent must be of such nature that the additive compound is not destroyed.

As the result of experimental research it has been found that mustard gas forms a brilliant yellow coloured product. This reaction is particularly noticeable if the mustard gas is present in relatively strong concentration. In order to be able to detect this gas even when in a state of high dilution in air or other gas, the mustard gas is brought from a state of dilution to one of high concentration. This change of concentration is effected by sucking the mixture to be tested through an adsorbent medium such as a white or colourless gel, e. g. silica gel. In this way the mustard gas is adsorbed by and is enriched on the gel, so that it is present in concentrated condition and can be readily detected.

As the di-chlor-diethyl sulphide clings to articles of all kinds, for example fabrics, it is also desirable to be able to test such articles for the presence of this gas. With this object a current of air may be passed over such articles, and the air current, charged, it may be, with mustard gas, sucked through a white or colourless gel.

Alternatively, the materials suspected to be carriers of mustard gas may be contacted or rubbed with cotton wool. Then a current of air is passed through the cotton wool, and, if mustard gas be present, is charged with mustard gas. This air current admixed with mustard gas is then passed through the gel and tested in the manner described.

*Example*

Air suspected to contain mustard gas, or air which has been passed over a suspected article, or air which has been passed through cotton wool with which the suspected materials have been contacted or rubbed is sucked through a test tube as represented in the drawing. Then a small quantity of a 5% gold chloride solution is admitted into the test tube at the air inlet end. After a short time the gel becomes coloured intensely yellow at the layer nearest the air inlet end. These parts contain mustard gas by formation of additive compounds of di-chlor-diethylsulphide and gold chloride, whereas at the parts free from mustard gas the gel is coloured slightly yellow, so that the layer 5 indicated in Fig. 2 can be recognized. Now hydrogen peroxide—e. g. of 3% concentration—is added in drops in order to destroy the gold chloride at the parts free from mustard gas, and to effect blue coloration of the gel instead of the yellow coloration. From this blue colour the yellow colour of the reaction product formed in the layer 5 is more clearly distinguished than from the yellow colour of the gold chloride.

It has been found that, besides gold chloride, also other salts of heavy metals can be used for the ready and rapid detection of mustard gas, but that said combination of hydrogen peroxide and gold chloride gives a specially noticeable and therefore useful reaction on account of the distinct changes of colour. It is also possible to operate without addition of hydrogen peroxide, that is, with salts of heavy metals alone, particularly with gold chloride.

Also the solution of the salt of the heavy metal may be applied to the gel before sucking therethrough the air charged with mustard gas.

I claim:—

1. The method of detecting the presence of mustard gas (Yperite) consisting in causing a medium containing mustard gas to act on a salt of a metal selected from the group consisting of gold, platinum, palladium and univalent copper to effect a change of color of said salt.

2. The method claimed in claim 1 in which the salt is gold chloride.

3. The method claimed in claim 1 in which the salt is platinum chloride.

4. The method claimed in claim 1 in which the salt is palladium chloride.

5. The method of detecting the presence of mustard gas consisting in causing a medium containing mustard gas to act upon a salt of a metal selected from the group consisting of gold, platinum, palladium and univalent copper to effect a change of color of said salt, and employing reducing agents to destroy the excess of said salt.

6. The method claimed in claim 5 in which hydrogen peroxide is used after the application of an aqueous solution of a salt of a metal selected from the group consisting of gold, platinum, palladium, and univalent copper.

7. The method claimed in claim 5 in which gold chloride in 5% aqueous solution and 3% hydrogen peroxide is used.

8. The method of detecting mustard gas consisting in sucking a gaseous current charged with mustard gas through a medium capable of adsorbing of mustard gas and causing the adsorbed gas to react with the salt of a metal selected from the group consisting of gold, platinum, palladium and univalent copper.

9. The method claimed in claim 8 in which the adsorbent medium is silica gel.

10. The method of detecting the presence of mustard gas in a gaseous medium consisting in sucking the said medium through a gel capable of adsorbing of mustard gas to effect enrichment of mustard gas on the gel, and treating the gel first with a solution of a salt of a metal selected from the group consisting of gold, platinum, palladium and univalent copper and then with hydrogen peroxide.

11. The method claimed in claim 10 in which the gaseous medium is first passed over an object suspected to be a carrier of mustard gas before being sucked through the gel.

12. The method claimed in claim 10, in which the gaseous medium is first passed through an envelope of cotton wool which has been contacted with an object suspected to be a carrier of mustard gas before being sucked into the gel.

13. The method of detecting the presence of mustard gas in a gaseous medium consisting in sucking the gaseous medium through an adsorbent gel disposed between plugs of glass wool and treating said gel and glass wool plugs first with a solution of a metal selected from the group consisting of gold palladium, platinum, and univalent copper and then with a reducing solution.

GUSTAV-ADOLF SCHRÖTER.